United States Patent [19]

Poro

[11] Patent Number: 5,016,491
[45] Date of Patent: May 21, 1991

[54] GEAR ASSEMBLY

[75] Inventor: Antti M. Poro, Hämeenlinna, Finland

[73] Assignee: Innoke Oy, Hameenlinna, Finland

[21] Appl. No.: 457,695

[22] PCT Filed: Jul. 14, 1988

[86] PCT No.: PCT/FI88/00117

§ 371 Date: Jan. 9, 1990

§ 102(e) Date: Jan. 9, 1990

[87] PCT Pub. No.: WO89/00651

PCT Pub. Date: Jan. 26, 1989

[30] Foreign Application Priority Data

Jul. 15, 1987 [FI] Finland ................... 873139

[51] Int. Cl.$^5$ .............................................. F16H 37/06
[52] U.S. Cl. ........................................ 74/640; 475/177
[58] Field of Search .................. 74/640; 475/176, 177

[56] References Cited

U.S. PATENT DOCUMENTS

| 4,425,822 | 1/1984 | Marschner et al. | 74/640 |
| 4,479,403 | 10/1984 | Marschner et al. | 74/640 |
| 4,616,529 | 10/1986 | Heinemann | 74/640 |

FOREIGN PATENT DOCUMENTS

| 241550 | 11/1985 | Japan | 74/640 |
| 804429 | 2/1981 | U.S.S.R. | 74/640 |
| 855292 | 8/1981 | U.S.S.R. | 74/640 |
| 879101 | 11/1981 | U.S.S.R. | 74/640 |
| 1130704 | 12/1984 | U.S.S.R. | 74/640 |

Primary Examiner—Dwight Diehl
Attorney, Agent, or Firm—Lyon & Lyon

[57] ABSTRACT

This invention relates to a gear assembly comprising two parallel dual strain wave gears. The moment transmission ability of the gear assembly is relatively high, if the gears are interconnected and they have a common flexspline (2) both ends of which are provided with a dual strain wave gear in such a manner that teeth (3a, 3b) on the outer surface of the flexspline are in meshing engagement with peripheral teeth (4a, 4a) on a first gear member and teeth (5a, 5b) on the inner surface of the flexspline (2) are in meshing engagement with shaft teeth (6a, 6b) on a second gear member. A ring (7) positioned between the teeth serves as a wave generator from which the torsional moment is transmitted into the flexspline through a bearing (8) and either one of the interconnected teeth in meshing engagement with the flexspline teeth may serve as a secondary shaft while the other remains receiving the difference between the secondary and the primary moment.

5 Claims, 4 Drawing Sheets

GEAR ASSEMBLY

BACKGROUND OF THE INVENTION

The invention relates to a gear assembly comprising two strain wave gears. The double strain wave gear arrangement, which is referred herein as dual strain wave gearing enables the connect of a motor to a gear assembly according to the invention to produce a compact gear motor organization. One advantageous application of such a motor is in mechanism characterized by a high torsional moment, a low speed of rotation, a small availability of space and low weight and where good parking accuracy may be required from the power device. An example of such device is the driving means of the movement joints in industrial robots.

In several known motor types, the greatest power is obtained from the motor at a speed of rotation higher than what is required for moving the load. Therefore, a reduction gear must be provided between the motor and the load so that the greater power obtained from the motor can be utilized as a high torsional moment at a low speed of rotation. As is known, a strain wave or harmonic gear provides a high reduction ratio while the gear takes up little space and its performance is good.

The principle of a strain wave gear is disclosed in U.S. Pat. No. 2,906,143, Sept. 29, 1959, Musser, and that of a dual strain wave gear in U.S. Pat. No. 2,943,513, Jun. 5,1960, Musser.

SUMMARY OF THE INVENTION

According to the invention two dual strain wave gears can be connected in parallel in such a way that the primary moment can be supplied to the gear assembly; for example, via an external annular primary shaft positioned between the gears, whereby the secondary shaft of the gear assembly may be sleevelike. The rotor in a motor, which can be made annular, can be directly used as a primary shaft. The invention can be employed with various types of electric motors, such as brushless direct-current motors or stepper motors, or it can be used with motors of other types, such as pneumatic motors. Because the moment transmission ability of the gear assembly of the invention is very high, its compact form and its range of transmission ratio (about 25 to 100:1) make it well suited for use as a reduction gear in an annular motor without considerably increasing the need of space thereof. The gear assembly can also be constructed substantially without clearances, and its diameter and, as a consequence, the moment transmission ability can be varied within wide limits while retaining the compact structure. Alternatively, where desired, the primary moment can be supplied to the gear assembly in other ways; for instance, via a separate drive shaft to an external ring or via a bearing positioned internally in the flexspline.

BRIEF DESCRIPTION OF THE DRAWINGS

In the following the invention and the preferred embodiments thereof will be described in more detail with reference to the examples of the attached drawings, wherein

FIGS. 1 and 2 illustrate the overall structure of a gear assembly. As showing the gear assembly can be comprises dual strain wave gears 1a and 1b having a common flexspline 2. The flexspline 2, at one end is provided with external teeth 3a operative as part of the gear 1a and interengageable with peripheral teeth 4a on a first gear member, and internal teeth 5a interengageable with the external or shaft teeth 6a of a second gear member. Correspondingly, the gear 1b comprises teeth 3b formed externally on the other end of flex spline 2 with which peripheral teeth 4b of the first gear member are interengageable, and internal teeth 5b that interengage with shaft teeth 6b on the second gear member. The flexspline 2 is made elliptical by means of a wave generator 7 positioned between the gears 1a and 1b, from which wave generator the primary moment is transmitted to the flexspline via a bearing 8. The flexspline can be formed into an elliptical shape by means of the bearing 8 or alternatively, by magnets disposed in the wave generator 7. The peripheral teeth 4a and 4b and the shaft teeth 6a and 6b of the gears 1a and 1b are both separately connected together such that either one of these pairs may serve as a secondary shaft while the other remains receiving the difference between the secondary and primary moment. In the disclosed arrangement, however, the shaft connecting the internal teeth 6a and 6b will be consistently referred to as "the secondary shaft ". In principle, by means of the disclosed, the moment transmission ability of the gear assembly is doubled as a result of the interconnection of the respective gear teeth.

FIGS. 3 and 4 show a gear assembly to which a brushless direct-current motor is attached as a motor. In this arrangement, the shaft teeth (6a and 6b) are integral with a common nonferromagnetic secondary shaft 9 and the peripheral teeth 4a and 4b are integral with outer circular splines 10a and 10b. In addition to the basic parts described above, the structure comprises an enclosure body 11, a stator 12, a stator winding 13 and a gear assembly wave generator 7 serving as the rotor of the motor. Permanent magnets 14 for the motor, permanent magnets 15 for making the flexspline elliptical, and support rings 16 thereof are positioned in the wave generator. The nonferromagnetic bearing 8 and air gaps 17 enable the movement of the rotor in relation to the flexspline. The rotor is mounted to the outer circular splines 10a and 10b by means of bearings 18a and 18b.

FIG. 5 shows magnetic circuits in the rotor 7 and the flexspline 2 for giving the flexspline an elliptical shape in the gear assembly of FIG. 3. The direction of the poles of the permanent magnets 15 fastened to the rotor 7 is chosen so that the magnetic flux revolves axially and radially via the flexspline, the permanent magnets 15 and the rotor. In this way, a strong magnetic attraction is obtained against the bearing 8 over a desired length of the peripherry of the bearing. By means of the support rings 16 it can be ensured that the magnets 15 remain fast and that the air gap 17 is maintained irrespective of the magnetic attraction. Since the magnetic flux does not penetrate the flexsplines, no major eddy currents are induced in the flexspline, in spite of the rotatory motion between it and the rotor. Eddy currents can be decreased by making the flexsplines in the area of the magnetic circuit of a material having high permeability, a good saturation value, and a high specific resistance. One way of further decreasing induction currents is to manufacture the flexspline in the area of the magnetic circuit by winding it of a thin band in such a way that a particularly thin insulating material layer is provided between the band surfaces for preventing the passage of radial induction currents. The hysteresis loss can be substantially reduced when the directions of motion of the magnetic fluxes in the flexspline are the same. In FIG. 5, the top and bottom fluxes thereby have opposite directions of rotation. The elliptic shape can also be obtained by adjusting the direction of the flux in the flexspline so that it is parallel with the periphery of the flexspline. Drawbacks caused thereby include the greater hysteresis losses.

FIG. 6 is a reduced view of a situation when the gear assembly is in motion. When the rotor 7 rotates over an angle $\alpha$, the flexspline 2 rolls along the outer periphery having the radius R a distance $s_1 = \alpha R$. The same distance $\alpha R$ of the flexspline thereby rolls over the curved portion s. A shorter length $s_2 = \alpha r$ thereby rolls away from the curved portion s. Since the length of the curved portion s remains the same, the secondary shaft having the radius r also has to turn a distance $s_3 = \beta r$ in a direction opposite to the direction of rotation of the rotor. The incident is illustrated by the equation:

$$s + s_1 - s_2 - s_3 = s$$

which can be simplified and solved as follows:

$$s_1 - s_2 - s_3 = 0$$

$$\alpha R - \alpha r - (-\beta) r = 0$$

$$\alpha (R - r) = -\beta r \text{ (positive clockwise direction of rotation)}$$

$$i = \frac{\alpha}{\beta} = -\frac{r}{R - r} = \text{reduction ratio}$$

The negative sign in the formula of the transmission ratio indicates that the secondary shaft rotates in a direction opposite to the direction of rotation of the primary shaft. In practice, the flexspline has a certain thickness and the inner and outer surfaces thereof have different numbers of gear teeth while the size of each tooth is the same. The transmission ratio can thereby be calculated by means of the formulae disclosed U.S. Pat. No. 2,943,513 in the patent relating to the dual strain wave gear.

Figure 4:
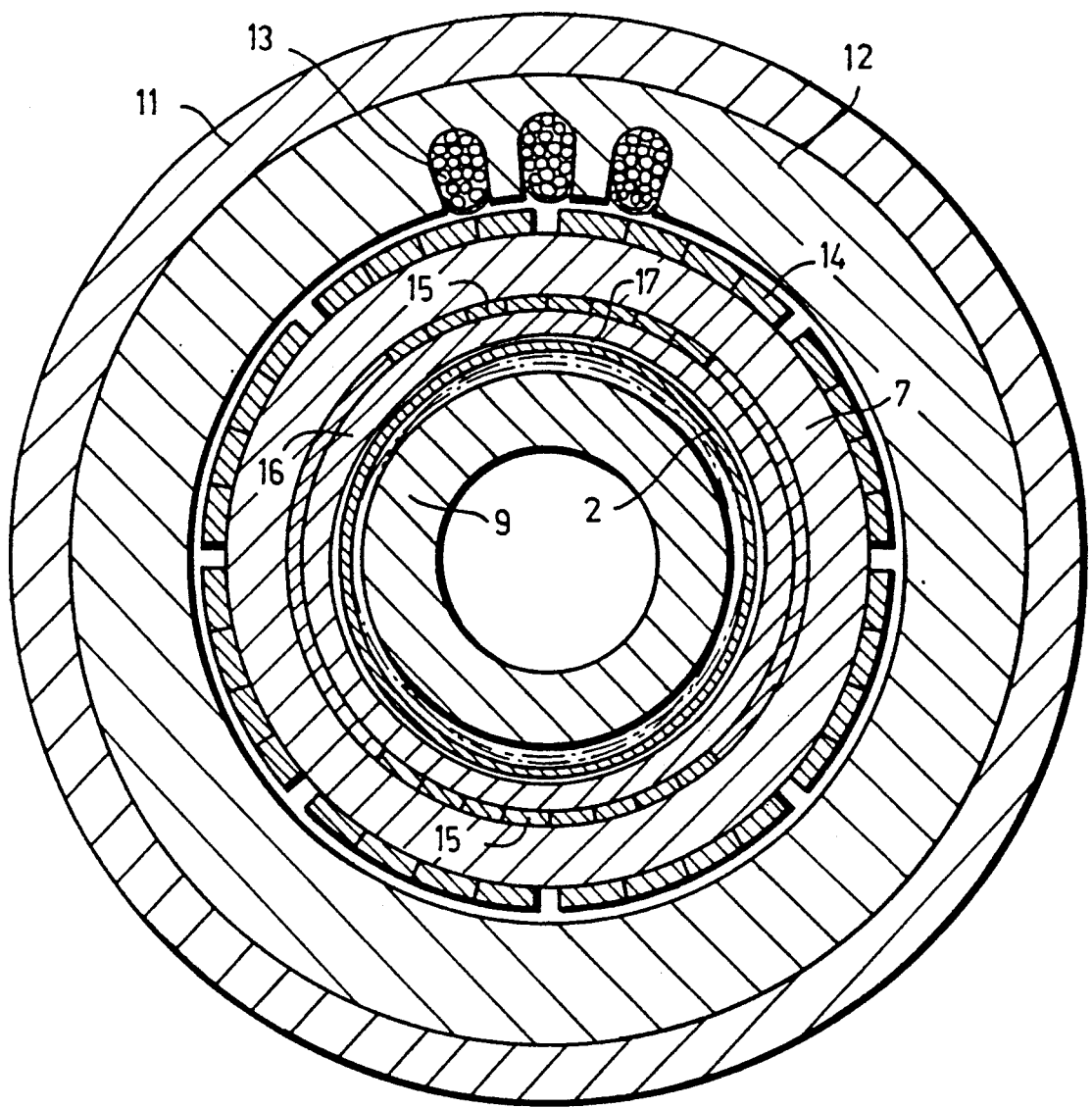
FIG. 4 is a cross-sectional view of the motor of FIG. 3 in the direction of the line A—A.
Figure 1:
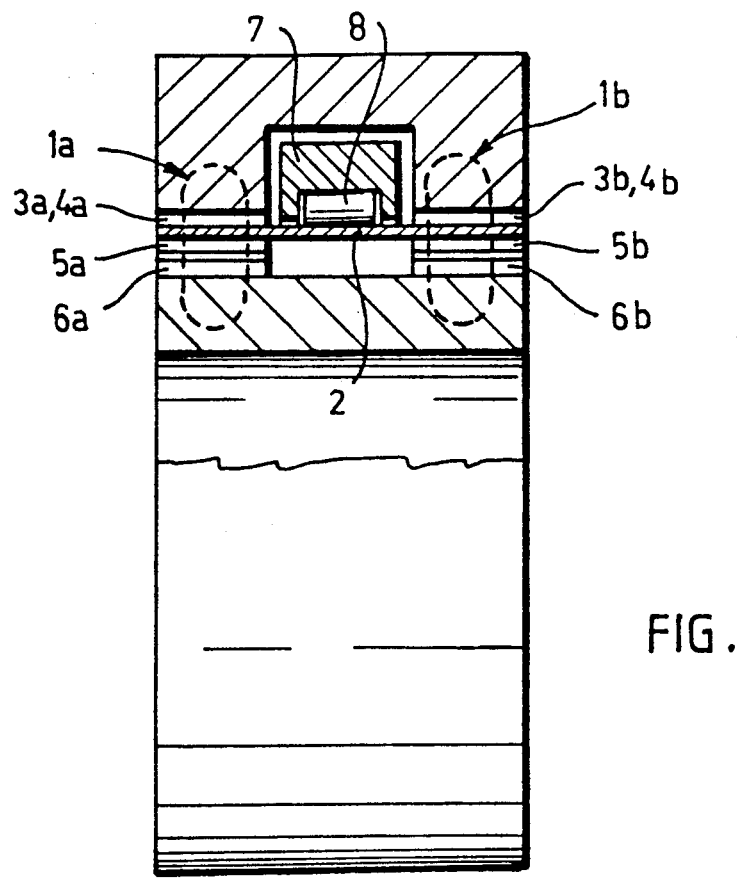
FIG. 1 illustrates the overall structure of a gear assembly according to the invention in a partial longitudinal cross-sectional view.
Figure 2:
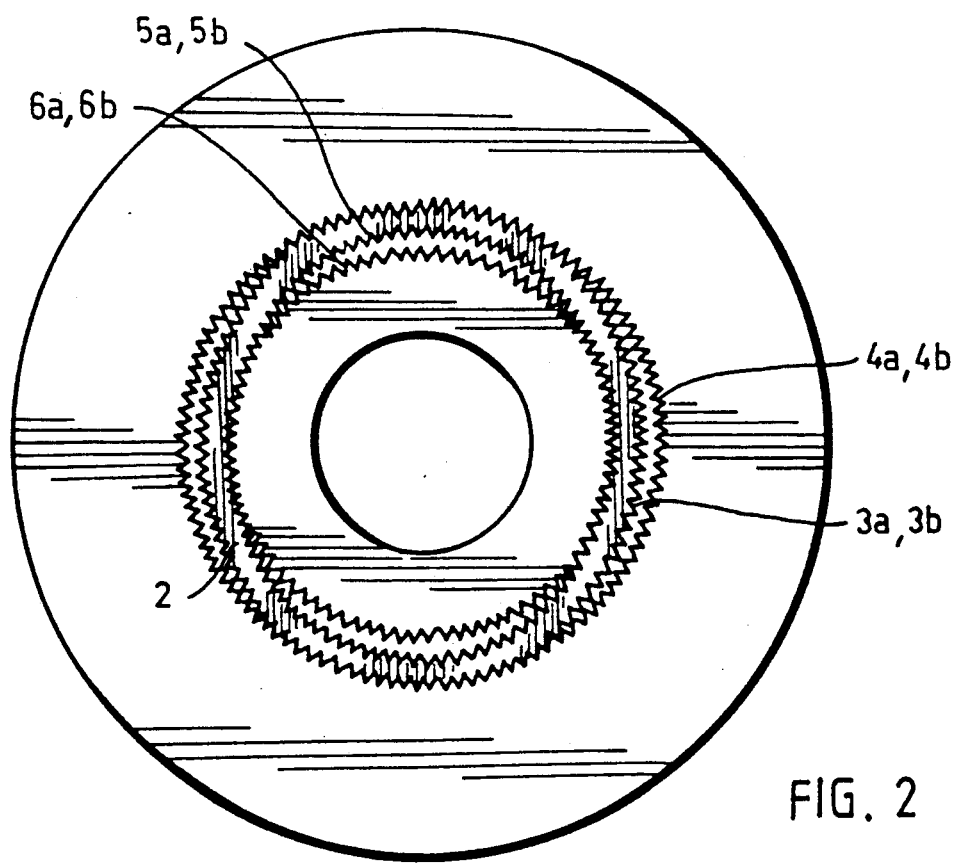
FIG. 2 illustrates an end projection of the previous figure.
Figure 3:
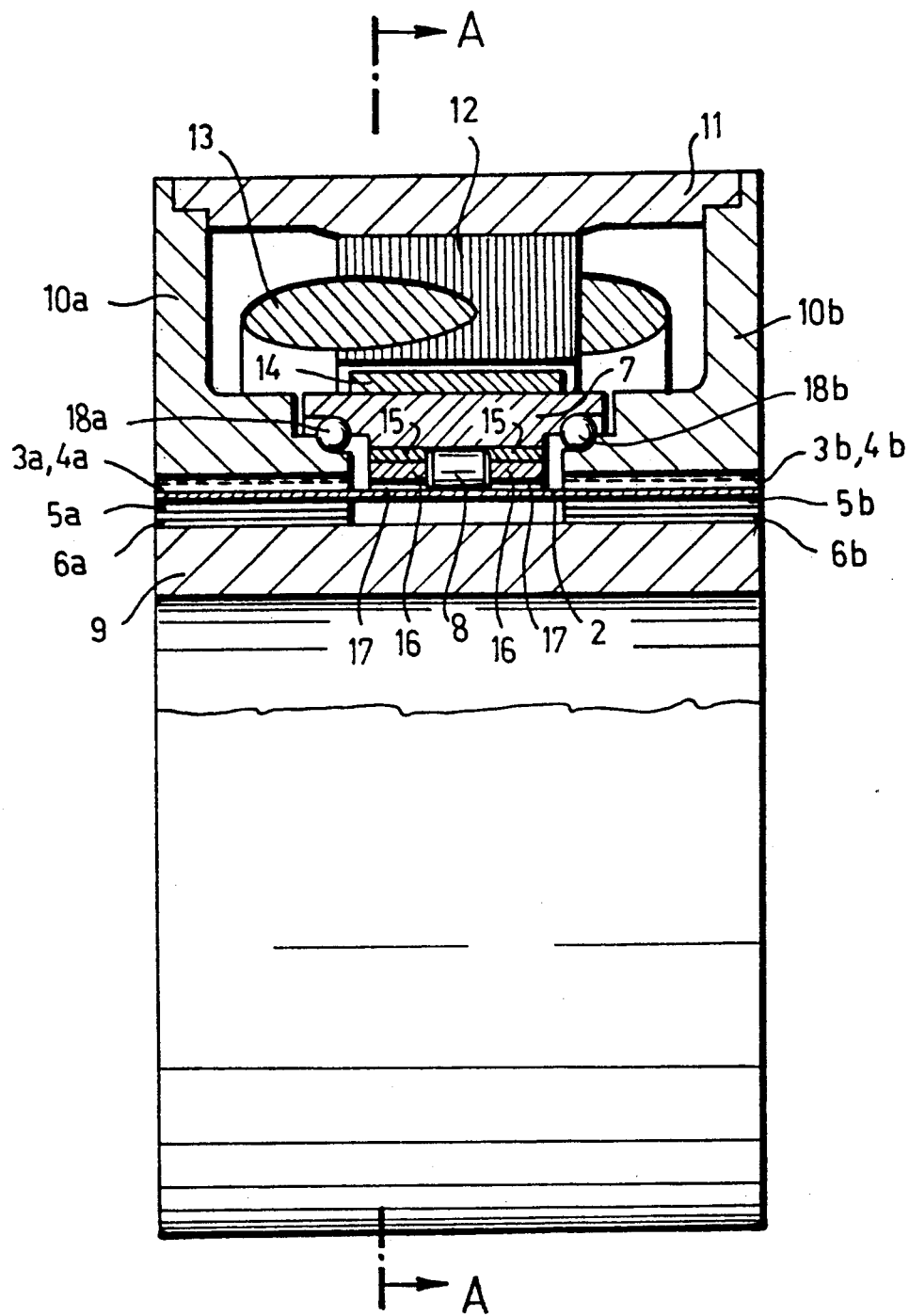
FIG. 3 is a partial longitudinal cross-sectional view of a gear assembly whereto a brushless direct-current motor is attached as motor.
Figure 5:
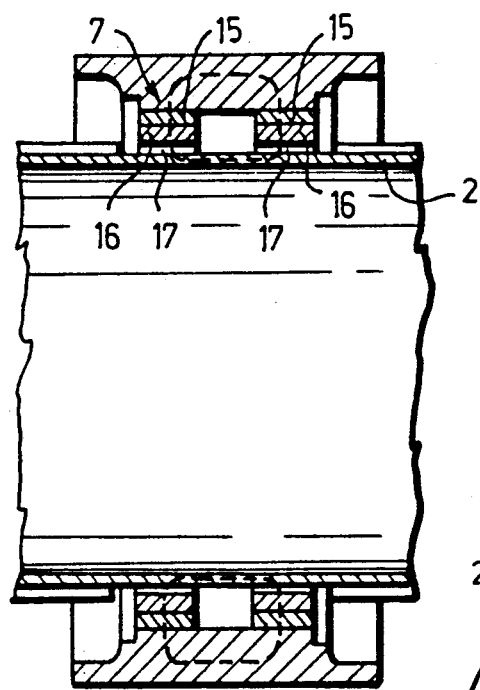
FIG. 5 illustrates the magnetic circuits for making the flexspline elliptical in the gear assembly of FIG. 3.
Figure 6:
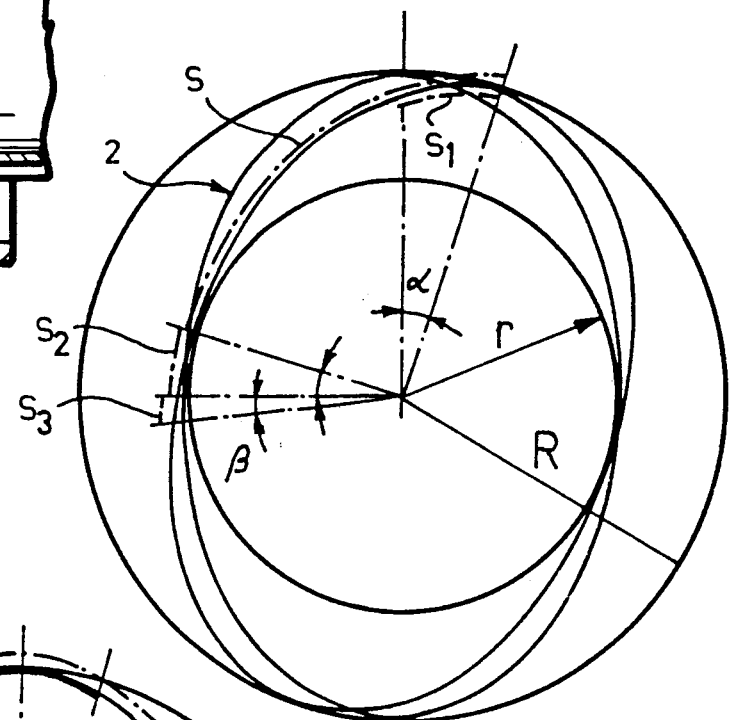
FIG. 6 is a reduced view of the operation of the gear assembly according to the invention as an end projection when the assembly is in motion.
Figure 7:
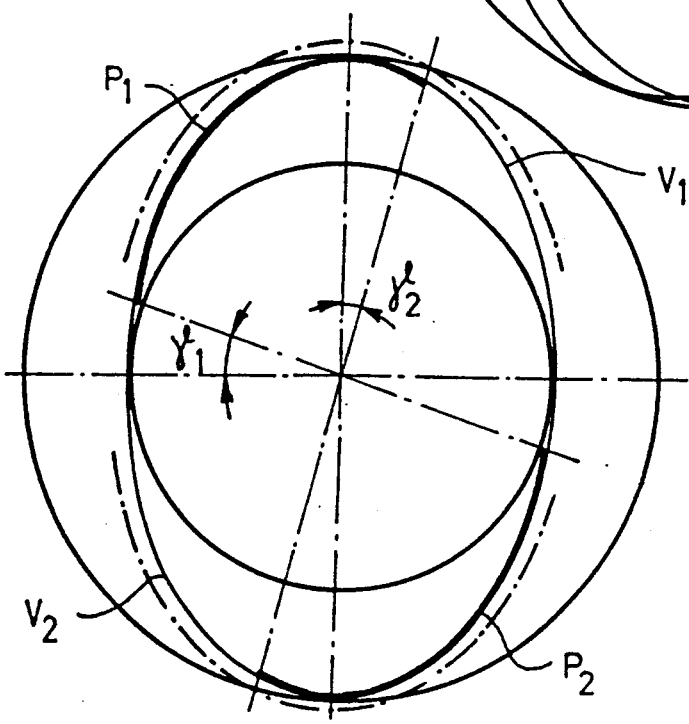
FIG. 7 illustrates the distribution of tangential stresses in the flexspline of the gear assembly within the dual strain wave gears as an end projection when the gear assembly is under load.

FIG. 7 shows the tangential tensile and compression stresses created in the flexspline 2 due to the load moment acting on the secondary shaft. When the secondary shaft rotates in a direction opposite to the direction of rotation of the primary shaft, a compression stress prevails within the curve length $p_1$ and $p_2$ and a tensile stress within the curve length $v_1$ and $v_2$. Since the gear teeth in a strain wave gear are not in contact at the apex points of the flexspline (even though they are interlocked), but beginning from a determined point after the tangential point, the zero stress points are positioned at a distance of determined angles $\gamma_1$ and $\gamma_2$ from the tangential points between the flexspline and the circle circumferences (apex points). Tangential tensile and compression stress states created in the flexspline due to the load are such that they tend to make the flexspline even more elliptical in the area of the dual strain wave gears 1a and 1b and to rotate the flexspline ellipse against the torsional moment of the primary shaft (of the rotor). If the flexspline ellipse of one side were twisted over a determined angle for this reason, this would cause a movement between the outer and inner peripheries within this area due to the gear mechanism. Since the outer and inner peripheries are interconnected on both sides of the gear assembly, the corresponding movement between the outer and inner periphery would also take place on the other side of the gear. This would further cause the flexspline ellipse to be twisted in a corresponding way also on this side of the gear assembly. Due to the gear mechanism, the twisting of the gear assembly is thus symmetrical on both sides of the gear assembly. Such a deformation of the flexspline ellipse in relation to the elliptical shape within the area of the wave generator requires shearing of material, for instance, and not only bending of the flexspline plate, if no buckling can take place. The twisting produces torsional stresses in the flexspline. However, these can be caused by the primary moment only, not by the secondary moment, wherefore the twistings remain small. The flexspline is not detached from the external elliptical shape of the wave generator, which is due to the fact that because it cannot be pressed out of shape within the compression stress areas $p_1$ and $p_2$ when the flexspline rests tightly against the supporting bearing by virtue of the attractive force of the permanent magnets, it cannot, either, be detached out of its shape inwards within the tensile stress areas $v_1$ and $v_2$. Further, the flexspline is not disengaged from the teeth of the secondary shaft, because the flexspline is pressed against the secondary shaft due to the tensile stresses acting within the areas $v_1$ and $v_2$. To sum up the above, it can be mentioned that the gear assembly is able to operate stably with respect to loads and rigidly with respect to resiliencies in the system. For obtaining an optimal moment transmission ability, the rigidity of the flexspline should be dimensioned taking into consideration all the stress components exerted thereon. This is concerned with optimizing by known methods, which will not be dealt with in more detail in this connection.

The flexspline of the gear assembly may also be given the elliptical shape by means of an external support bearing 8, whereby no separate pulling magnets are needed. While the support bearing 8 presses the flexspline against the teeth of the secondary shaft, the flexspline is simultaneously pressed against external peripheral teeth in the perpendicular plane. Due to necessary bearing clearances, this kine of gear assembly is more liable to torsional clearances than when the elliptical shape is obtained by magnetism. An advantage, however, is that no eddy currents are therefore induced in the flexspline and the ferromagnetic properties need not be taken into account in the choice of material of the parts.

The flexspline can be made elliptical and the supply of primary moment in it can also be effected internally from its in a corresponding way.

If desired, the torsional clearances of the gear assembly can be reduced by dividing the teeth of the outer periphery and the secondary shaft in two parts in the longitudinal direction. By turning the counterteeth portions of each toothing in the flexspline with respect to each other and by locking the portions together, a contact without any clearance is obtained between the toothings.

The gear assembly has been described above as one in which the flexspline of dual strain wave gears is formed by two lobes. It should be understood, however, that the gear assembly is also operative even though the number of the lobes would differ from the above, like dual strain wave gears generally do.

The gear assembly can be easily sealed so as to be lubricant-proof and the entrance of external impurities into the teeth can be prevented, even though this has not been illustrated in the example figures for the sake of the clarity thereof.

The secondary shaft of the gear assembly gets a certain radial support through the flexspline. The radial and axial load capacity of the secondary shaft can further be improved by external bearings. Further, the flexspline can be supported axially. None of these features have been shown in the drawing figures for the sake of the clarity thereof.

The gear assembly can also serve as a promotion gear, whereby the secondary shaft acts as a driving shaft.

If desired, a ball nut and a ball screw, or like axially movable element, can be positioned in connection with the secondary shaft, whereby a strong, accurate and compact axial power device is obtained.

Gear assemblies can be connected in parallel e.g. on a driven shaft, whereby their moment transmission ability with respect to the shaft is the sum of the moment transmission abilities of individual gears.

Gear assemblies can be connected in sequence by connecting them with each other so that the secondary shaft of a preceding gear is connected to the primary rim of the former one. The transmission ratio of the combination is thereby the product of individual transmission ratios.

Even though the invention and the applications thereof have been described above with reference to the examples of the attached drawings, the invention is not restricted thereto, but one skilled in the art can, of course, modify it within the inventive idea disclosed in the attached claims as well as within his own knowledge.

I claim:

1. A gear assembly including two strain wave gearings, each having inwardly facing gear teeth on a first gear member, outwardly facing gear teeth on a second gear member and an annular flexspline disposed intermediate said gear members having gear teeth on the inner and outer surfaces thereof in meshing engagement with said gear teeth on said first and second gear members, respectively, the invention comprising:
    said flexspline extending between and being common to both of said strain wave gearings to interconnect them for parallel operation; and
    a wave generator carried by said gear assembly including means for giving said flexspline an elliptical form and for transmitting a torsional moment between said wave generator and said flexspline.

2. A gear assembly according to claim 1 wherein said wave generator is interposed between said strain wave gearings and including a support bearing for transmitting said torsional moment between said wave generator and said flexspline.

3. A gear assembly according to claim 2 wherein said flexspline forming means comprises magnets positioned in said wave generator to produce magnetic flux revolving axially and radially over a desired length of said wave generator via said flexspline, said magnets and said wave generator.

4. A gear assembly according to claim 2 in which said flexspline forming means comprises said support bearing.

5. A gear assembly according to any one of claims 1 to 4 including a motor having a rotor attached to said gear assembly wherein said wave generator is integral with said motor.

* * * * *